US006575363B1

(12) United States Patent
Leason et al.

(10) Patent No.: US 6,575,363 B1
(45) Date of Patent: Jun. 10, 2003

(54) VENDING MACHINE

(76) Inventors: David Leason, 28 Garey Dr., Chappaqua, NY (US) 10514; Scott L. Sullivan, 3 Garden Ridge, Chappaqua, NY (US) 10514

( * ) Notice: Subject to any disclaimer, the term of this patent is extended or adjusted under 35 U.S.C. 154(b) by 211 days.

(21) Appl. No.: 09/751,619

(22) Filed: Dec. 28, 2000

Related U.S. Application Data

(60) Provisional application No. 60/174,186, filed on Dec. 29, 1999.

(51) Int. Cl.[7] .................................... G06F 7/08

(52) U.S. Cl. .................................... 235/381; 186/3

(58) Field of Search .................................... 235/381, 380, 235/392, 385, 383; 186/3; 194/9, 10, 2; 221/125, 129, 21

(56) References Cited

U.S. PATENT DOCUMENTS 3,762,526 A * 10/1973 Kiefer .................... 194/222
3,826,344 A * 7/1974 Wahlberg .................... 194/206
3,841,456 A * 10/1974 Levasseur .................... 194/217
4,044,877 A * 8/1977 Burton .................... 194/200
4,498,570 A * 2/1985 King et al. .................... 194/217
5,734,150 A * 3/1998 Brown et al. .................... 235/375
6,193,154 B1 * 2/2001 Phillips et al. .................... 235/380
2002/0087413 A1 * 7/2002 Mahaffy et al. .................... 705/16

* cited by examiner

*Primary Examiner*—Thien M. Le

(57) ABSTRACT

A vending machine that can dispense an item at multiple price points is described. The vending machine dispenses one or more items, each ordinarily having a predetermined price. The vending machine receives a proof-of-purchase (POP) identifier, and has a processor configured to permit at least one of the items in the machine to be dispensed for less than the predetermined price if the POP identifier was received. A method for enticing a further sale at one or more vending machines is also described in which a random customer is provided with a POP identifier in response to a purchase from a first vending machine. The POP identifier is thereafter received at a second vending machine that ordinarily vends each of its items at respective predetermined prices. A particular item is vended from the second vending machine for less than its predetermined price in response to at least one predetermined criterion such as the receipt of the POP identifier.

20 Claims, 4 Drawing Sheets

VENDING MACHINE

This patent application claims the benefit of priority under 35 U.S.C. Section 119 from U.S. Provisional Patent Application Ser. No. 60/174,186, filed Dec. 29, 1999, entitled "Systems for Reduced Cost Follow-On Transactions Including Vending Machine and Rebate Transaction System," the entirety of which is hereby incorporated by reference.

FIELD OF THE INVENTION

The present invention relates to vending machines and, more particularly, to a vending machine and method for managing discounted purchase transactions.

BACKGROUND OF THE INVENTION

Many public areas are fitted with machines for vending food, beverages and other small items. In known vending machine designs, each item available for purchase has a purchase price and is dispensed when sufficient funds have been inserted. Recently, a machine has been proposed which changes the price of soft drinks in response to local weather conditions. Whether such a machine will be met with favor remains to be proven.

The patent literature describes vending machines that provide volume discounts and incentives to their users. U.S. Pat. No. 5,988,346 discloses a subscription system in which customers pre-pay for a particular vending machine product. Subscribers identify themselves using a code and realize a per unit discount as compared to non-subscribers. U.S. Pat. No. 5,491,326 similarly discloses a discount to "vend card" users as compared to cash users. Also, redemption points may be awarded for purchases using the vend card, though such points are recorded separate from the card holder's remaining purchase credit balance. U.S. Pat. No. 4,498,570 describes a vending machine that vends items at a discount from an initial price provided that the full price is paid for a first item in the same transaction. The first item purchase must always be at full price. U.S. Pat. No. 4,008,792 also discloses a control circuit which provides volume discounts in vending machines. Collectively, these systems still fail to provide follow-on purchase incentives to encourage random consumers to return to one or more vending machines to make additional purchases within a relatively short period of time after having made a first purchase.

What is needed in the art and has heretofore not been available is a vending machine that provides random customers with incentives to make further purchases. The present invention satisfies this and other needs.

SUMMARY OF THE INVENTION

The present invention provides a vending machine that dispenses an item at multiple price points, depending on whether the customer has provided proof of a prior purchase from the same vending machine or a machine connected to that vending machine. The benefits of the present invention result free of any subscription or pre-payment as in prior art systems, and can direct a random consumer toward particular items based on information maintained in a data store associated with the vending machine. Consequently, random consumers can become faithful customers through discount incentives which will continue to be provided so long as the consumer complies with any restrictions (e.g., on timing or item selection).

In accordance with one aspect of the invention, a method is described for enticing a further sale at one or more vending machines. In this method, a customer is provided with a proof-of-purchase (POP) identifier in response to a first purchase from a first vending machine. The POP identifier is thereafter received at a second vending machine that ordinarily vends each of its items at respective predetermined prices. However, a particular item is vended from the second vending machine for less than its predetermined price in response to the receipt of the POP identifier.

The first and second vending machines can be the same machine in some embodiments, but if they are different machines, the method preferably includes the additional step of providing a communication link between the first and second vending machines. Importantly, when a single vending machine implements this aspect of the invention, a discount is provided in a separate purchase transaction, and further discounts can be realized by a customer if additional POP identifiers are used in further purchase transactions.

In accordance with another aspect of the invention, an improved vending machine is described. The vending machine is of the type that dispenses one or more items, each item ordinarily being dispensed at a predetermined price. The vending machine includes a means for receiving a first proof-of-purchase (POP) identifier, a processor configured to permit at least one of the items in the machine to be dispensed for less than the predetermined price in response to the first POP identifier, and a means for selectively dispensing a second POP identifier in accordance with a rule base as a function of the dispensed item.

These and other aspects, embodiments, and features, of the invention can be appreciated from the accompanying Drawing Figures and Detailed Description of a Preferred Embodiment.

BRIEF DESCRIPTION OF THE DRAWING FIGURES

DETAILED DESCRIPTION OF A PREFERRED EMBODIMENT

Figure 1:
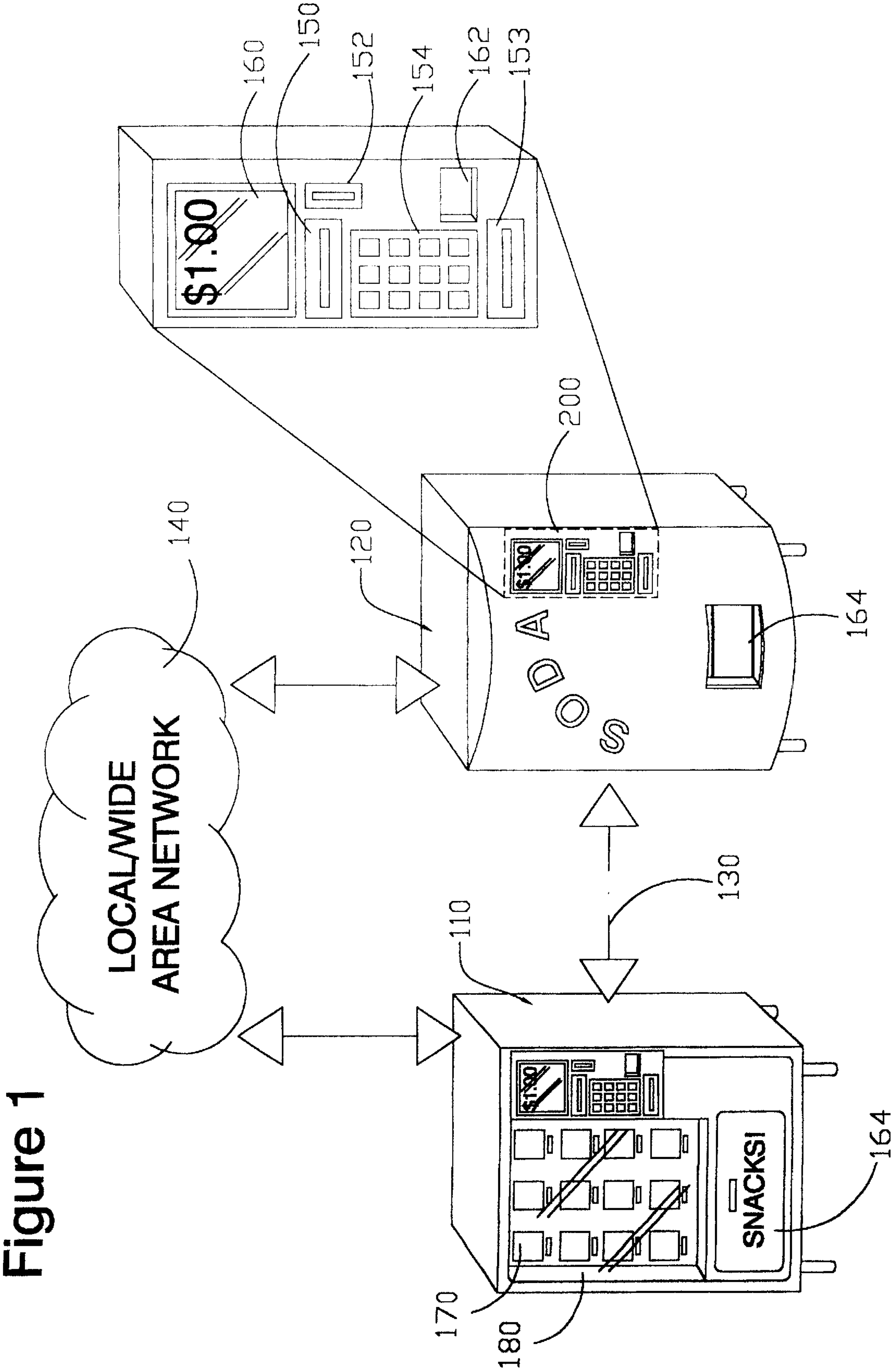
FIG. 1 illustrates two vending machines connected together in accordance with a preferred embodiment of the invention.

By way of overview and introduction, FIG. 1 illustrates a preferred embodiment of the invention in which two vending machines 110, 120 are communicatively connected to one another either through a direct link 130 (wired or wireless) or through a network 140, such as a local area network (LAN), a wide area network (WAN), or other distributed network such as the Internet. Communication between the vending machines 110, 120 can be in any conventional manner. The invention can be embodied and executed with a single vending machine free of any communication link to another machine, as will be appreciated from the following description.

The input devices include a paper bill intake 150, a coin intake 152, a prepaid card intake 153, and a button keypad 154. The output devices include a display 160, a change return 162, and an item dispenser 164. The items 170 available for selection from the vending machine 110, 120 optionally are viewable through a window 180 and are selected by entering a code using the keypad 154. Alternatively, items 170 can be directly selected using a designated, labeled button (e.g., "cola" or "diet cola").

Figure 2:
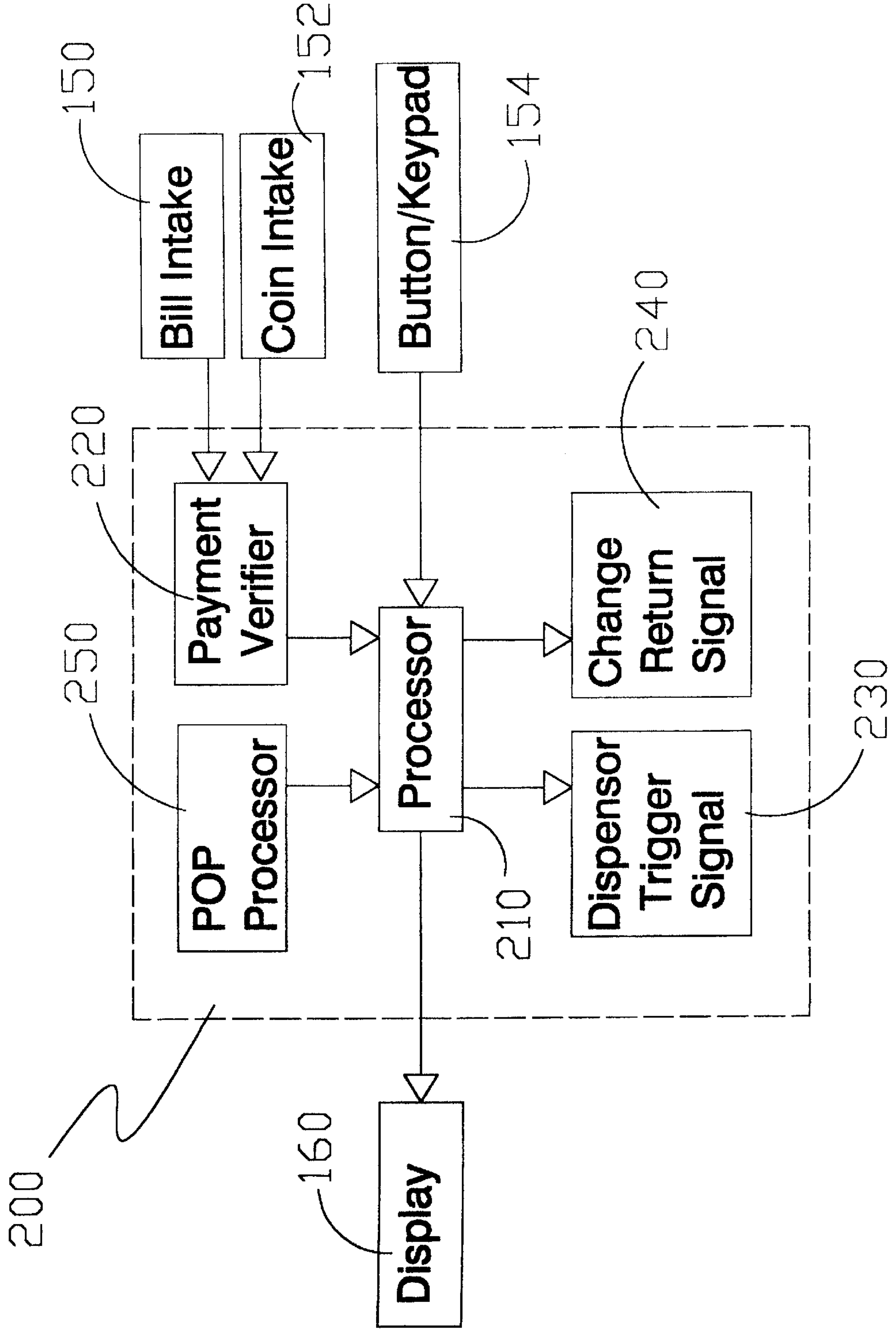
FIG. 2 illustrates a block diagram of a transaction processing module internal to the vending machines of FIG. 1.

A vending machine in accordance with the preferred embodiment includes a transaction processing module 200 configured to permit items to be dispensed for less than their specified price if a customer provides a proof-of-purchase (POP) identifier to the machine. Such a module is shown in FIG. 2 and is preferably internal to the vending machines 110, 120, plugging into and controlling the standard input and output devices provided on such vending machines. The transaction-processing module 200 governs a purchase transaction session with a customer by coordinating the steps attendant with dispensing one or more items from the vending machine.

With further reference to FIG. 2, a processor 210 within the transaction-processing module receives verified payment signals from a payment verifier 220. The payment verifier 220 determines the amount and authenticity of bills and coins received at the bill and coin intakes 150, 152, respectively. The verified input amount is reported to the processor 210. Preferably, the processor 210 is programmed to continuously update the display 160 in response to any money being received and in response to any items being dispensed so that the customer's credit balance is always displayed. A customer enters an item selection using a button or keypad 154 and each item selection is reported to the processor 210.

The processor 210 is programmed to generate a dispenser trigger signal 230 if advised by the payment verifier 229 that a sufficient amount of money has been received to cover a predetermined price for the item selection. The trigger signal causes an item to be dispensed from the dispenser 164. In addition, the processor 210 is preferably programmed to generate a change return signal 240 that causes any remaining money credit to be returned through the change return 162.

In accordance with a salient aspect of the invention, customers can obtain items from the vending machine at a discounted price if the transaction-processing module 200 detects a POP identifier. The POP identifier can be processed by a separate POP processor 250, or by a routine executed by the processor 210. The POP processor 250 preferably includes a data store and a rule base which (1) coordinates discount offers with particular proof-of-purchase identifiers, (2) logs vending machine purchase transactions for testing the validity of an input POP identifier and for other purposes, and (3) coordinates communications with other machines connected through the link 130 or the network 140.

Preferably, the system and method of the present invention are implemented by a transaction processing module 200 which is internal to the vending machine 110, as described with reference to FIG. 3; however, the process of FIG. 3 can be implemented in other manners such as by a transaction processing module in another machine connected to the vending machine 110, for example, through the link 130 or the network 140. When implemented in the transaction-processing module, the invention can be realized in existing vending machines by replacing their respective transaction processing modules with the module 200.

Figure 3:
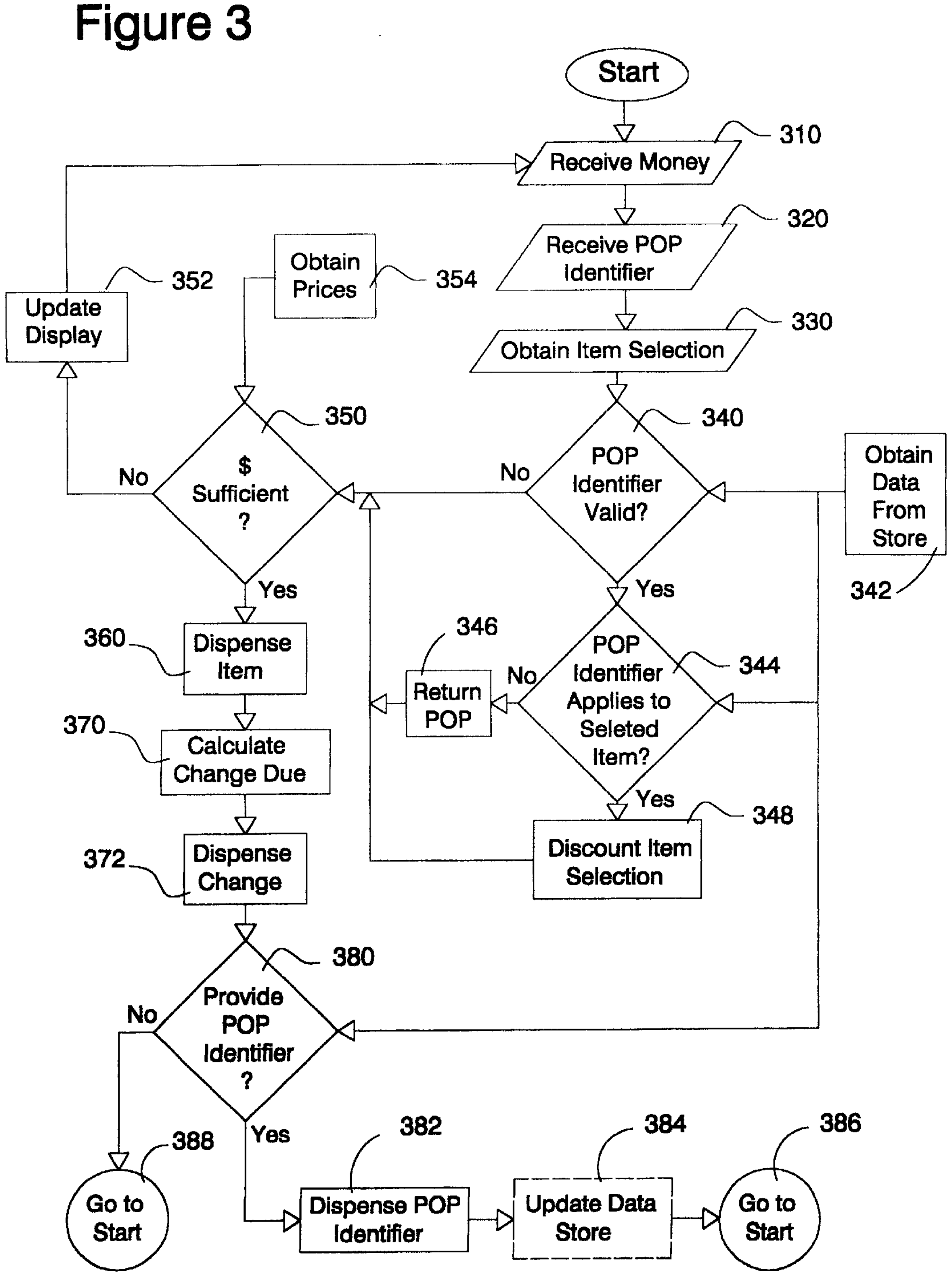
FIG. 3 is a flow diagram that illustrates a method in accordance with the preferred embodiment for managing discounted and non-discounted purchase transactions.

Referring now to FIG. 3, money is received in the vending machine 110 at step 310 through the bill and coin intakes 150, 152, verified by the payment verifier 220, and displayed by the display 160 in a conventional manner. At step 320, a POP identifier is optionally received in accordance with the invention. The customer can next select an item, with the item selection being obtained at step 330. The selection can be for an item selected at random by the consumer.

In the event that a POP identifier is received in the vending machine 110, it is tested for validity at step 340. Preferably, the benefits accorded to a customer based on a purchase transaction are constrained to only be validly redeemable within a prescribed period of time. The validity period can be set to be one week, one day, one hour, or otherwise. The validity period can also be set to commence the next day, etc. The validity data permits the preferred embodiment to more broadly encourage vending machine loyalty than prior art machines which provide volume discounts in a single purchase transaction.

The vending machine can obtain validity data from a data store 342 (which can be part of the POP processor 250), or from the POP identifier itself (e.g., by implementing the POP identifier as a pre-paid card or coded coin or coded ticket/coupon). If the POP identifier is not valid, the process flow advances to step 350 to test whether the money received at step 310 is sufficient to purchase the selected item. On the other hand, if the POP identifier is valid, a test is made at step 344 to determine whether that POP identifier provides a discount for the selected item. The POP identifier will provide a discount if a determination is made that at least one predetermined criterion is met. Preferably, the test at step 344 also is informed by data from the data store 342 or from the POP identifier itself. If the POP identifier does not apply to the selected item, it can be returned to the customer at step 346, with the process flow again being directed to step 350. If, however, the predetermined criterion is met, then a confirmation signal is generated and the predetermined price of the selected item is discounted at step 348. Thereafter, the process flow continues at step 350 to test whether the money received at step 310 is sufficient.

At step 350, the money that was received is tested against the predetermined price of the item selected at step 330, less any discount that may have been awarded at step 348. This test is informed by pricing data, which is preferably stored within the vending machine 110 and obtained at step 354. If the amount of money received is not sufficient to purchase the selected item, then the display 160 is updated at step 352, and the vending machine awaits the receipt of additional money at step 310. On the other hand, if the funds are sufficient, the item is dispensed at step 360 and any change due is calculated at step 370 and dispensed at step 372.

At step 380, a decision is made whether to issue a POP identifier to the customer in response to the purchase transaction of the foregoing session (steps 310–372). A POP identifier can be dispensed in response to each purchase transaction, or only in response to the purchase of particular items (such as in response to the purchase of a less frequently purchased item), or only if a particular promotion is in progress. The determination of whether to issue a POP identifier is preferably informed by information made available to the vending machine, such as by obtaining data from the data store, as indicated at step 342. It should be understood that arbitrary customers can be provided with POP identifiers to encourage follow-on purchases from the same vending machine or from a machine connected to that vending machine. If the POP identifier is to be dispensed, it is done so at step 382 either through the change return 162, dispenser 164, or ejected from the bill intake 150 or other device. Optionally, the data store 342 is updated at step 384 for testing the period of validity of the POP identifier at step 340 during a subsequent purchase transaction session in which the POP identifier is tendered. The vending machine then goes to an idle state waiting to receive money from a customer, as indicated at steps 386 and 388.

Figure 4:
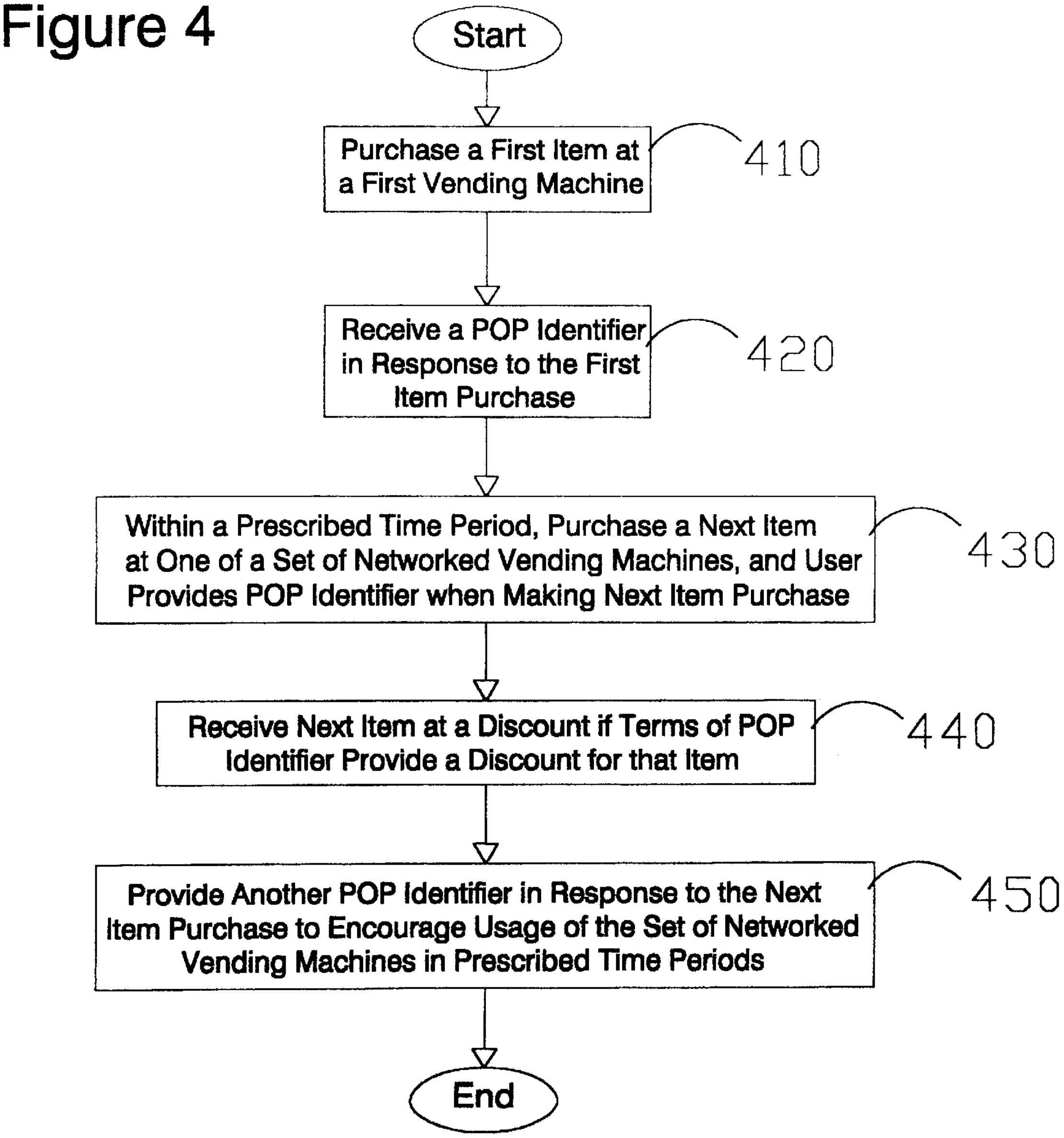
FIG. 4 is a flow diagram that illustrates the steps taken by a customer to obtain items from the vending machines of FIG. 1 at a discount.

Referring now to FIG. 4, the steps that a customer takes to obtain an item at a discount from the vending machine 110 are described. The process starts at step 410 with the customer purchasing a first item from the vending machine 110 in a conventional manner, including, a random selection of an item and payment received at that time for the selected item. In accordance with the invention, a POP identifier can be issued at step 420 in response to this purchase transaction. The issuance of the POP identifier is substantially as described above in connection with steps 380–384.

Thereafter, at step 430, the customer provides the POP identifier to the vending machine within a prescribed period of time, for example, within two days. The POP identifier is provided to and received at one of several networked vending machines as described above at step 320. The customer makes a next item selection (as described above at step 330), and receives that item at a discount at step 440 if the POP identifier is valid and applies to the selected item (see steps 340–348). Optionally, the customer is provided with another POP identifier at step 450, in response to the purchase transaction session of steps 430–440, to encourage further usage of one of the set of networked vending machines within a prescribed period of time. The decision process and dispensing of POP identifiers is as described above in connection with steps 380–384.

The foregoing detailed description is to enable one of skill in the art to practice the invention and is not restrictive of the invention, which instead is defined solely by the recitations in the appended claims, which claims encompass methods and systems which include the elements recited in the claims and equivalents thereof.

We claim:

1. A method for enticing a further purchase at one or more vending machines, comprising the steps of:

a) selectively dispensing a proof-of-purchase (POP) identifier in response to a first purchase from a first vending machine;

b) in the further purchase, selectively receiving the POP identifier at a second vending machine which vends a specific item at a price;

c) receiving money at the second vending machine for the further purchase; and d) vending the specific item from the second vending machine for less than said price if the POP identifier was received and if sufficient money was received at the second vending machine for the further purchase.

2. The method as in claim 1, wherein the specific item is vended for less than said price if the POP identifier was received and if a temporal condition is satisfied.

3. The method as in claim 2, wherein the temporal condition is the passage of time and the temporal condition is satisfied if less than a predetermined period of time has elapsed between dispensing the POP identifier from the first vending machine and receiving the POP identifier at the second vending machine.

4. The method as in claim 1, wherein the first and second vending machines are the same.

5. The method as in claim 1, including the additional step of providing a communication link between the first and second vending machines.

6. The method as in claim 1, including the additional step of determining that the POP identifier applies to the specific item and generating a confirmation signal in response thereto, wherein the vending step vends the specific item for less than said price if the POP identifier was received and the confirmation signal was generated.

7. The method as in claim 6, wherein the first and second vending machines are the same.

8. The method as in claim 6, wherein the temporal condition is the passage of time and the temporal condition is satisfied if less than a predetermined period of time has elapsed between providing the POP identifier from the first vending machine and receiving the POP identifier at the second vending machine.

9. The method as in claim 8, wherein the first and second vending machines are the same.

10. The method as in claim 1, including the additional step of selectively dispensing a further POP identifier in response to the vending step.

11. The method as in claim 10, wherein the further POP identifier is dispensed in response to the vending step.

12. The method as in claim 10, wherein the further POP identifier is dispensed only in response to the vending of a particular item from the second vending machine.

13. The method as in claim 10, wherein the determination as to whether to dispense the further POP identifier is made using information from a data store.

14. The method as in claim 13, wherein the data store is updated to include the further POP identifier.

15. In a vending machine of the type which dispenses one or more items in a purchase made at the vending machine, each item being dispensed for a predetermined price, the improvement comprising:

a) means for receiving a first proof-of-purchase (POP) identifier;

b) means for receiving money;

c) a processor configured to permit a user selected one of said items to be dispensed by the vending machine for less than the predetermined price if the first POP identifier is received and if sufficient money was received for the purchase; and d) means for selectively dispensing a second POP identifier for use in a further purchase, said dispensing means being governed by a rule base which determines whether to dispense the second POP identifier as a function of the user selected item.

16. The vending machine as in claim 15, wherein the receiving means is one of a coin slot, a paper-currency reader, and a card reader.

17. The vending machine as in claim 15, wherein the receiving means is a keypad.

18. The vending machine as in claim 17, further comprising a dispenser responsive to inputs at the keypad to dispense at least one of said items.

19. The method as in claim 1, wherein, when the first and second vending machines comprise a single vending machine, the first and further purchases are made in separate purchase transactions.

20. The method as in claim 1, including the additional step of determining if sufficient money has been received prior to the vending step.

* * * * *